United States Patent Office 2,854,313
Patented Sept. 30, 1958

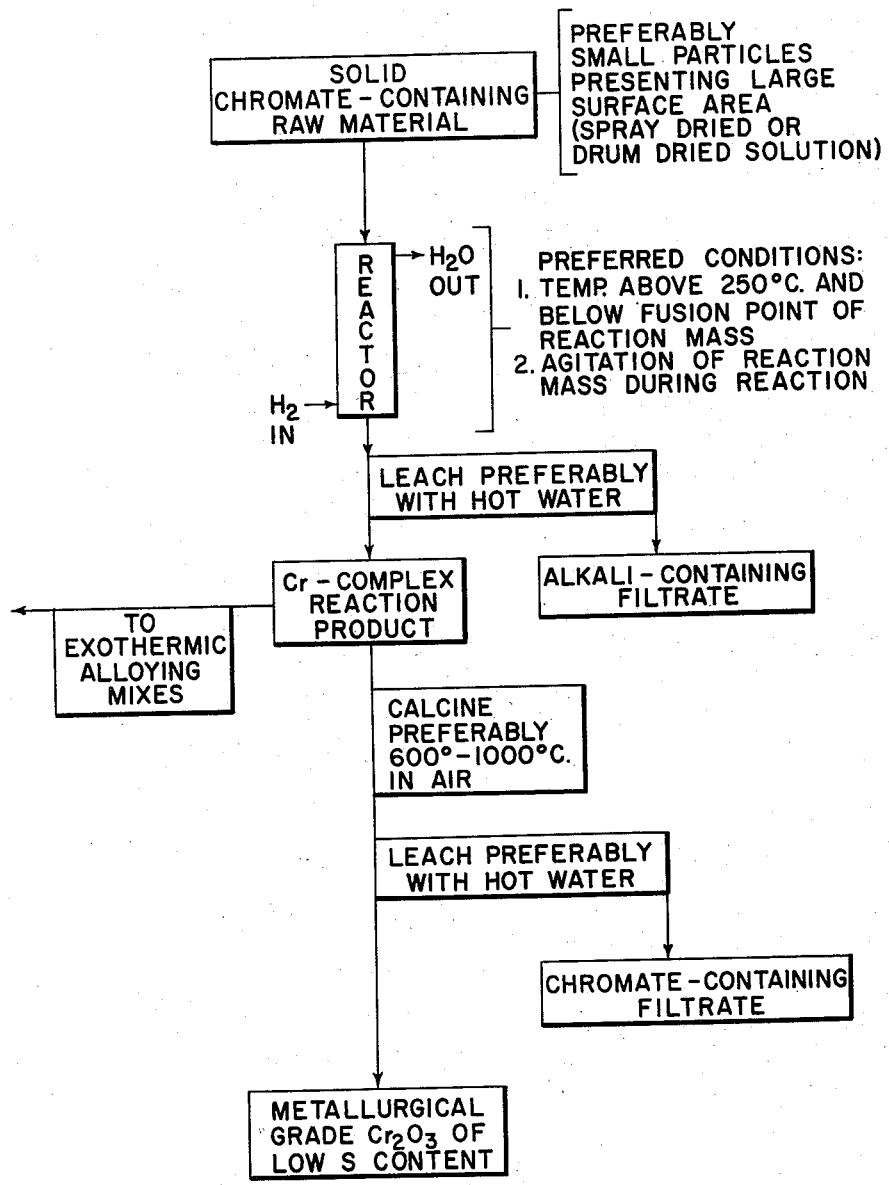

2,854,313

METHOD OF REACTING ALKALI METAL CHROMATES WITH HYDROGEN

Robert G. Banner, Painesville, Ohio, assignor to Diamond Alkali Company, Cleveland, Ohio, a corporation of Delaware Application April 21, 1953, Serial No. 350,140

14 Claims. (Cl. 23—56)

This invention relates to a method for treating alkali metal chromates, in which method a partially chemically-reduced reaction product is obtained, and more particularly relates to a method for treating alkali metal chromates with gaseous hydrogen to obtain a partially chemically-reduced reaction product, from which chromic oxide of high purity and low carbon and sulfur content, alkali metal chromate, and exothermic chromium-containing alloying materials may be obtained.

This application is a continuation-in-part of my co-pending application Ser. No. 299,237, filed July 16, 1952, now abandoned.

It has heretofore been proposed to react dry, solid alkali metal chromates with various substances having an affinity for the oxygen of the chromate radical. Such substances have included carbon in its various forms, such as charcoal, coke, woody material, graphitic carbon, and the like, as well as sulfur in its elemental form, or combined with alkali metal sulfide as a polysulfide, elemental hydrogen, and low molecular weight organic compounds containing hydrogen chemically combined with carbon in various proportions. The reaction of these substances with dry, solid alkali metal chromates has heretofore generally been considered in the art as purely a reducing action, in which the chromate radical is reduced to a mixture of chromic oxide and various amounts of residual alkali metal oxide, or hydroxide, which has been considered as occluded by the chromic oxide product.

The methods heretofore proposed for the reduction of alkali metal chromates with elemental hydrogen have been directed to the use of additional constituents, for example, carbon-containing compounds, such as woody materials, in order to prevent fusion of the alkali metal chromate during the reaction. The attempt to carry out the reaction of alkali metal chromates with elemental hydrogen alone has heretofore been unsuccessful, and reacting alkali metal chromates with elemental hydrogen, together with an additional constituent intended to prevent fusion and maintain the reducing effectiveness of the hydrogen, has led to reaction products containing a relatively high proportion of elemental carbon or other undesirable constituents which carry over into the chromic oxide ultimately produced therefrom; the carbon and other undesirable constituents can be removed from the chromic oxide only by rather expensive calcining in an oxidizing atmosphere, thereby adding considerably to the cost of producing a relatively pure chromic oxide.

It has now been found that in the reaction of an alkali metal chromate with a substance, such as hydrogen, carbon, sulfur, or the like, heretofore regarded in the classical sense as equivalent reducing agents producing the same end product, reaction of each member of the above group with alkali metal chromate tends to produce a reaction product having a chemical composition and chemical characteristics substantially different from those of each of the others. The various reaction products formed appear to be complex chromium-containing compounds, in which the chromium may exist in chemical co-ordination with other elements, and these complex compounds do not exhibit the chemical and physical properties of physical mixtures of trivalent and hexavalent chromium compounds. This is particularly true in connection with the product obtained by the reaction of an alkali metal chromate with elemental hydrogen at temperatures below that at which fusion of the reaction mass is encountered. In this reaction the reaction product formed contains, in addition to the chromium, appreciable amounts of sodium, hydrogen, and oxygen, and these constituents are not removable from the reaction product by ordinary treatment, such as by titration of the alkalinity with normal acid solutions, nor by ordinary processes, such as leaching with boiling water. The constituents of such reaction product appear to be dissociated only by rather drastic treatment with extremely strong oxidizing agents, such as boiling perchloric acid, ignition at 650°–1000° C., and like treatment.

It has been found, moreover, that gaseous hydrogen reacts with alkali metal chromate at a lower temperature than do the others of the above-noted reducing agents, and that this lower reaction temperature affords a means for obtaining a granular, pulverulent reaction product without the difficulties attendant upon fusion of the reaction mass encountered in prior art methods. Accordingly, the present invention solves the problem of obtaining the reaction product of an alkali metal chromate with gaseous hydrogen, the alkali metal chromate being in the solid state, without experiencing the fusion of the reacting mass during the reaction, heretofore considered characteristic of this reaction. Moreover, the present invention provides for the recovery of the reaction product of an alkali metal chromate and gaseous hydrogen, and of the chromium values of such reaction product.

One of the objects of the present invention is to provide a method for the reaction of gaseous hydrogen with an alkali metal chromate, in which method fusion of the reacting mass during the reaction of the hydrogen with the alkali metal chromate is prevented, and a granular pulverulent solid is obtained.

Another object of the invention is to provide a new and useful composition of matter comprising the product obtained from the reaction of an alkali metal chromate and elemental hydrogen at temperatures below the fusion temperature of the reacting mass.

Another object of the invention is to provide for the recovery of chromium values of the reaction product of hydrogen with an alkali metal chromate, as an alkali metal chromate and as chromic oxide of a relatively high degree of purity, containing substantially no carbon or sulfur, or other metallurgically deleterious components.

A further object of the invention is the obtaining of the aforesaid chromium values from a relatively impure alkali metal chromate-containing solid raw material.

These and other objects of the invention will be apparent from the description and examples provided hereinafter.

Pursuant to the above-stated objects, the present invention comprises the method which includes the steps of passing a stream of gaseous hydrogen in contact with a mass comprising alkali metal chromate, maintaining said mass at a temperature above about 250° C., and below the fusion point of the reacting mass during the contact of said hydrogen and chromate until the reaction of said chromate and hydrogen is substantially complete, and recovering the chromium-containing reaction product thus formed.

Referring to the drawing, attached hereto and made a part hereof, there is presented a chemical process flowsheet illustrating the steps and preferred conditions of the method of the present invention; the compositions of matter obtained, and various other aspects of the invention are described hereinbelow.

The solid alkali metal chromate-containing raw material employed in the present invention may be one comprising any of the alkali metal chromates, such as lithium, sodium, potassium, rubidium, or cesium chromate; preferably, however, the chromate-containing raw material is either sodium chromate in the form of a substantially pure crystalline anhydrous salt, or impure sodium chromate in admixture with other compounds not reactive with sodium chromate under the conditions hereof, for example, the sodium chromate obtained from the leach liquors resulting from leaching alkaline oxidation roasts of chromite ores. Such a chromate-containing material may be obtained by crystallization, drum-drying, or spray-drying of the leach liquors, and will ordinarily contain, in addition to the sodium chromate, relatively minor amounts of sodium aluminate, sodium hydroxide, or sodium carbonate, together with somewhat lesser amounts of sodium sulfate and sodium silicate.

In the process of the present invention, sodium aluminate, sodium hydroxide, and sodium carbonate appear to be substantially unaffected during the reaction of hydrogen with alkali metal chromate, and are removed in the subsequent leaching of the reaction product; small amounts of the sodium sulfate may, under some conditions of the method of the present invention, be reduced to sodium sulfide, which is subsequently removed during the leaching, as is the sodium silicate, whereby the impurities of the crude sodium chromate-containing material do not affect metallurgical processes in which the chromium oxide, which may ultimately be produced by the process of the present invention, is subsequently employed.

In the event that the crude sodium chromate-containing material also contains sodium hydroxide in excess of about 15% of the total weight of the raw material, it is preferable, in the process of the present invention, to employ some means of extracting at least a portion of the sodium hydroxide from the starting material to reduce the sodium hydroxide content thereof to somewhat less than 15%, for example, of the order of 5%-10%. Such extraction of the sodium hydroxide content may conveniently be effected by contacting the crude solid with carbon dioxide, or passing carbon dioxide into a solution of the crude material with the attendant precipitation of sodium bicarbonate or sodium carbonate, together with the aluminum values of the solution as the trihydrate of aluminum oxide or its equivalent, with the subsequent separation of these values from the liquor, and recovery of the sodium chromate content of the mother liquor by crystallization, drum-drying, spray-drying, or the like.

Another method for the removal of the sodium hydroxide from the crude starting material includes extraction with a low molecular weight aliphatic alcohol, such as methyl alcohol, which method has the advantage of not requiring the dissolution of the crude material and the subsequent recrystallization of the sodium chromate content thereof prior to subjecting the sodium chromate material to the process of the present invention.

Alternatively, if removal of the sodium hydroxide is not feasible in the course of practicing the present invention, diluents, preferably those which will not contaminate the reaction product with undesirable components, may be employed to prevent fusion of the reaction mass. Such diluents include the leached reaction product of hydrogen and the alkali metal chromate employed, as well as the purified chromic oxide which may be obtained from the process, by oxidation of the reaction product of hydrogen and alkali metal chromate.

Moreover, where operating conditions dictate, diluents of the above type may be employed to prevent fusion of the reaction mass under conditions of high temperature and high rate of consumption of the reactants.

It is preferable, however, not to use diluent materials with the alkali metal chromate fed to the reactor, but rather to maintain temperatures of the reaction mass above about 250° C., and below the fusion point thereof, and to control the temperature of the reaction mass by the rate of throughput of reactants, thereby avoiding the handling of large volumes of materials in the reactor, and likewise avoiding the necessity of supplying extra heat energy over that provided by the reaction.

The gaseous hydrogen employed in the method of the present invention may be derived from any suitable source of hydrogen, such as from the electrolysis of sodium chloride brine or other aqueous solution of an electrolyte. Hydrogen gas containing inert diluents to the extent of more than one-half of the mixture is somewhat less desirable since inert diluents tend to slow the overall reaction rate and require energy to be supplied to the reaction mass. Substantial amounts of diluents reactive with alkali metal chromates under the conditions of the process of the present invention tend to alter chemically the nature of the reaction products, as well as the yields of chromic oxide and alkali metal chromate obtainable therefrom by roasting the reaction product in air.

In the method of the present invention, carbon dioxide and nitrogen are considered to be inert materials insofar as the alkali metal chromate-containing constituents are concerned and, therefore, may be tolerated as diluent materials for the hydrogen gas. Moreover, carbon dioxide, under the conditions of the method of the present invention, reacts with sodium hydroxide present in the crude chromate-containing raw material, or in the reaction product, to form sodium carbonate, which sodium carbonate, in addition to aiding in the maintaining of a granular reaction mass during the course of the reaction, may be leached from the reaction product in a subsequent step in the process.

In the practice of the method of the present invention, the alkali metal chromate-containing starting material, preferably in the form of finely divided particles of sodium chromate, is heated to a temperature above 250° C., but below the fusion point of the starting material, and hydrogen gas is passed in contact with the alkali metal chromate material while maintaining the temperature of the mass of chromate-containing material above 250° C. and below the fusion point of the reacting mass for a period of time sufficient substantially to complete the reaction of hydrogen with the alkali metal chromate.

It has been found in the course of the investigation leading to the method of the present invention, particularly where no diluent material for the reaction mass is employed, that at temperatures above 250° C., and up to the glow temperature of the reaction product, fusion of the reaction product in an atmosphere of hydrogen is not experienced. However, the concentration of the reaction product of hydrogen and sodium chromate in the reacting mass, as well as the concentration of impurities, affects the fusion point of the reaction mass and, in general, the temperature at which the reaction mass will fuse, to a degree that the efficiency of the reaction and the apparatus in which it is carried out is impaired, becomes higher as the concentration of the reaction product in the reaction mass increases. Thus, with a sodium chromate-containing raw material, the ultimate particle size of which is within the range of 40–200 microns, heated to a temperature above about 250° C., and below its fusion point, and with a high feed rate of hydrogen, reaction of a mass of such material with hydrogen appears to be initiated at a point on the surface of mass from which the glowing spreads rapidly, similar in appearance to the afterglowing of charred, thin pieces of cloth or paper. If such a reacting mass is gently agitated during the reaction, so as to expose the submerged portions, glowing similar in appearance to that of embers, may also be observed. Under these conditions, incipient fusion of some of the constituents of the reacting mass may be encountered, with the result that friable, pebble-size, agglomerates of the reaction mass are formed, but the efficiency of the reaction, as well as the efficiency of the apparatus in which the reaction is carried out, remains unimpaired.

Also, where a high rate of throughput of reactants is continued over an extended period of time, the rate of heat transfer from the reacting mass to the heat exchange surfaces of the reactor and to the gas stream passing through the reactor may be insufficient to maintain the temperature of the reacting mass below its fusion temperature, whereupon accumulation of fused material upon reactor surfaces in contact therewith is encountered. In these circumstances, both the efficiency of the reaction and of the reactor are seriously impaired within a relatively short period of time, to the point where only about half the chromate content of the raw material undergoes any reaction with the hydrogen, and agitation of the reaction becomes substantially impossible.

This latter condition obtains more frequently when the chromate-containing raw material is in the form of relatively large particles, such as those obtained by concentrating leach liquor from alkaline chrome roasts as described above, and crystallizing sodium chromate from the concentrated liquor. With such raw material, and a relatively high throughput of reactants, the mass of material undergoing reaction will exhibit the glow phenomenon, but in a manner different from that wherein the particles of raw material are relatively finely divided, e. g., the spray-dried leach liquor. With the relatively large particles of the crystallized material, a large portion of the reacting mass begins to glow, as opposed to a small localized area, from which the glow spreads to other parts of the mass, and rapidly envelops the whole mass. Under these conditions this glowing during reaction is sustained for a much longer period, and the efficiency of the reaction and the reactor are much more quickly impaired. However, this condition is readily controlled by decreasing the rate at which the reactants are fed to the reactor and allowing a somewhat longer time of contact of reactants, as well as providing heat exchange means to effect removal of some of the heat of reaction from submerged portions of the reacting mass.

Consequently, in the practice of the method of the present invention, it is desirable initially to maintain the temperature of the reaction mass within the above range so as to prevent or retard fusion thereof. Subsequently, as the concentration of the reaction product in the reaction mass increases, the temperature of the reaction mass may, if desired, be allowed to increase to a temperature substantially within the range of 300°–600° C., without deleteriously affecting the course of the reaction or the physical form of the reaction mass, and a reaction product in granular form, readily leached to remove undesirable impurities, is obtained.

After the reaction is substantially complete, the reaction product is preferably leached with water at a temperature of the order of 100° C. in order to separate the composition of the present invention from undesirable impurities and by-products of the reaction, such as sodium carbonate, sodium hydroxide, and the like, prior to the subsequent steps in the process which may be employed for the recovery of the chromium values of the reaction product as sodium chromate and chromic oxide. The thus-obtained reaction product comprising the composition of the present invention, is then suitably dried to give a pulverulent solid, which may then be used in certain metallurgical exothermic alloying mixes, as more particularly described and claimed in co-pending application, Serial No. 410,014, filed February 12, 1954, in the names of Tom S. Perrin and Howard E. Everson, now Patent No. 2,707,610, and Serial No. 410,042, filed February 12, 1954, in the names of Tom S. Perrin, Howard E. Everson, and Harry B. Kinnear, or may be employed in accordance with further steps in the method of the present invention for the obtaining of alkali metal chromate and a chromic oxide of a high degree of purity suitable for use in the manufacture of chromium metal in accordance with methods heretofore described in the art.

The reaction product of the hydrogen-alkali metal chromate-containing material is next suitably calcined, for example, at a temperature preferably above 600°–1000° C., in an oxidizing atmosphere, for example, by passing air over the material during the heating thereof to the above temperature, which calcining operation breaks down the chromium complex to a mixture of chromic oxide and alkali metal chromate. Thereafter, the alkali metal chromate is suitably removed from the mixture by leaching, preferably with hot water, for example, water at a temperature near the boiling point thereof. The leached mixture is filtered, and alkali metal chromate recovered as a solution thereof in water, leaving a solid residue of chromic oxide of a high degree of purity, containing substantially no carbon or sulfur compounds which might be deleterious in subsequent metallurgical processes in which the chromic oxide may be employed.

Where a crude alkali metal chromate-containing material is employed as one of the raw materials in the method of the present invention, it has been found that certain constituents of such crude material affect the course of the reaction of the hydrogen with the alkali metal chromate contained in the crude material so as to vary slightly the amount of alkali metal chromate and chromic oxide recovered from the reaction product after calcining in an oxidizing atmosphere. For example, it has been found that where the amount of sodium hydroxide in a crude sodium chromate-containing material exceeds about 15% of the total composition of the crude material, the amount of sodium chromate recovered from the reaction product decreases with the increase in sodium hydroxide content, with a corresponding increase in the chromic oxide produced. Thus, when a substantially pure sodium chromate is employed in the method of the present invention, and the reaction is carried forward to the point where about 99.5% of such sodium chromate is reacted with the hydrogen, the percentage of chromium recovered as sodium chromate amounts to about 33% of the chromium content of the reaction product, whereas if the sodium hydroxide content of the crude material is of the order of about 17%, the reaction product will contain sodium chromate only to the extent of about 17% of the total chromium in said product with correspondingly lesser amounts of chromium recovered as sodium chromate when the amount of NaOH exceeds the above value. Within the same range of sodium hydroxide concentration, i. e., from substantially 0% to about 17%, the amount of chromium recovered as chromic oxide varies from about 67% to about 83%.

It has also been found that with caustic soda as a constituent of the starting material, the amount of chromium recovered as sodium chromate from the reaction product of sodium chromate and hydrogen increases with an increase in the temperature within the range of about 250° C. to about 425° C. Thus, it has been found that where caustic soda is present in the starting material to the extent of about 17%, the amount of chromium recovered as sodium chromate from the reaction product of sodium chromate and hydrogen will ordinarily be of the order of about 27% at the lower end of the above temperature range and will increase to about 34% at the upper limit of the above range, with a corresponding decrease in the amount of chromium recovered as chromic oxide from about 74% at the lower end of the above temperature range to about 66% at the upper end of the range. Suitable adjustments of caustic soda concentration in the starting material and temperature will similarly affect the ratio of chromate and chromic oxide obtained.

A factor to be taken into account is the exothermic nature of the reaction. It has been found in the course of the investigation leading up to the method of the present invention that the reaction of alkali metal chromate with gaseous hydrogen is sufficiently exothermic to maintain the reaction temperature within the reaction mass in a stationary bed of alkali metal chromate-containing material, even where only a very moderate amount of heat insulation is employed in the construction of the reaction zone.

However, it has also been found that where the bed of alkali metal chromate material is moderately agitated during the course of the reaction of hydrogen gas therewith, the gentle agitation has a tendency to expose fresh surfaces of the alkali metal chromate particles, and by controlling the amount of hydrogen introduced into a reaction zone in which the particles of alkali metal chromate material are reacted, fusion of the reaction mass may be prevented, and the reaction sustained without further external heating once it is initiated. Under such conditions, it is preferable, in accordance with the present invention, to provide for the countercurrent contact of hydrogen and alkali metal chromate during the course of the reaction. In this manner, the fresh alkali metal chromate-containing material introduced into a reaction zone comes in contact with the more dilute hydrogen gas passing therethrough, whereas the more concentrated hydrogen gas is brought into contact with the more nearly completely reacted reaction mass in that portion of the reaction zone from which the reaction mass is expelled. In this manner, fusion of the reaction mass during the course of the reaction is substantially precluded and the alkali metal chromate material is reacted with the hydrogen gas to the extent of more than 99% of the available alkali metal chromate present in the reaction mass.

In order that those skilled in the art may better understand the method of the present invention and in what manner the same may be carried into effect, the following specific examples are offered:

*Example I*

150 parts of a crude sodium chromate-containing solid (61.6% sodium chromate), having an alkali content, calculated as NaOH, of 17.1%, are treated with 238 parts of absolute methyl alcohol to decrease the amount of free alkali contained in the crude chromate mixture. Upon filtration of the alcohol-crude chromate mixture, it is found that 16.5 parts of alkali, calculated as NaOH, remain associated with the crude chromate material. The filter cake, after extraction with methyl alcohol, is heated to remove the small amount of methyl alcohol remaining associated with the cake, transferred to a tubular reactor, and heated to a temperature of 204° C., at which temperature hydrogen gas is passed over the solid contained in the tubular reactor. Reaction between the sodium chromate and hydrogen is not evident at this temperature, whereupon the temperature of the reactor is increased to about 260° C., at which time it is observed that water vapors are issuing from the effluent end of the reactor. The temperature of the reaction mass is maintained at about 260° C. until an appreciable amount of reaction between the hydrogen and sodium chromate has taken place, as evidenced by the amount of water condensed from the effluent gases issuing from the reactor. Thereafter, the temperature of the reactor is allowed to rise to about 315° C., at which temperature hydrogen gas is passed over the solid material in the tubular reactor until no further amount of water is condensible from the effluent gases issuing from the reactor. The solid reaction product is removed from the reactor and leached with 200 parts of hot water by slurrying the solid material in boiling water and maintaining the mixture of reaction product and water at the boiling temperature for a period of about 15 minutes. The leached reaction product is then filtered, washed with 100 parts of hot water, reslurried in 150 parts of hot water, filtered, and washed again with 100 parts of hot water. Analysis of the filtrate for sodium chromate shows that the reaction between the sodium chromate content of the starting material and the hydrogen gas is 99.4% complete. The solid filter cake is dried at 110° C. for a period of about 16 hours. The dried material is then analyzed for its chromium content, which chromium content is arbitrarily calculated as chromic oxide ($Cr_2O_3$) and is found to be 74% of the dried leached filter cake. The dried filter cake is then calcined at 1000° C. for 1 hour, cooled and weighed, and found to have lost 1.15% on calcining at 1000° C. The calcined material is leached with hot water in the manner described above for the leaching of the reaction product of the hydrogen and the crude sodium chromate-containing material, until no further evidence of hexavalent chromium is found in the washed solid. The amount of sodium chromate thus leached from the calcined filter cake amounts to 42.6% of the calcined material, or about 19.6% of the chromium content (calculated as $Cr_2O_3$) of the hydrogen-sodium chromate reaction product.

*Example II*

A crude sodium chromate mixture containing 61.6% of sodium chromate, 12.4% of sodium aluminate, and 17.1% of free alkali calculated as NaOH, is treated with absolute methyl alcohol in the manner described in Example I above, 200 parts by weight of the crude chromate-containing material being taken for treatment. 56% of the free alkali, calculated as NaOH, is extracted from the crude chromate-containing material in this manner. The material from which 56% of the free alkali has been extracted with methyl alcohol is dried to expel adsorbed methyl alcohol and the dried material divided into three equal portions for treatment in a tubular reactor in which the reaction mass is maintained quiescent during the reaction. Hydrogen gas is passed through the three portions of dried crude material for a period of 1 hour each at the temperatures, and with the results, noted in the table below:

| Reaction Temperature | Percent $Na_2CrO_4$ Reacted | Leached Reaction Product— Cr Content Calc'd as $Cr_2O_3$ | Calcination at 1,000° C. in air. $Na_2CrO_4$ content, Percent of Calcined Product |
|---|---|---|---|
| 315° C | 99.5 | 76.4 | 44.4 |
| 370° C | 99.8 | 75.5 | 43.4 |
| 426° C | 99.5 | 72 | 55.5 |

In the experiment, in which the starting temperature for the reaction is 426° C., some fusion of the reaction mass is encountered, and the removal of the reaction mass from the tubular reactor causes some difficulty. A portion of a crude chromate-containing material having substantially the same analysis as the material employed for the experiments resulting in the data in the table given above, is heated to 650° C. and hydrogen passed thereover for a period of 1 hour. At the end of the reaction period, the reaction mass is found to be fused substantially completely with very few individual particles existing in the mass; it is further found that appreciably less reaction (less than 50% of the sodium chromate in the crude mixture reacting) takes place than is obtained at the temperature given in the table above. The product of reaction between hydrogen and the sodium chromate, however, is sufficient for analysis and it is found that the amount of chromium contained in the reaction product (calculated arbitrarily as $Cr_2O_3$) is 71.6%, and when the reaction product is calcined in air at 1000° C. for a period of ½ hour, the calcined product contains 48.5% of oxidized chromium calculated as sodium chromate, which amounts to about 31.8% of the chromium content of the reaction product converted to sodium chromate.

Example III

Successive samples of 50 parts of a crude sodium chromate-containing material, having a composition of 61.6% of sodium chromate, 12.4% of sodium aluminate, and 17.2% of free alkali, calculated as NaOH, and of which varying amounts of the free alkali have been extracted in accordance with the procedures described in Examples I and II, are placed in a tublular reactor and heated to a temperature of 315° C. Gaseous hydrogen is passed through the samples, while maintaining the temperature of the reaction mass at substantially 315° C., for a period of 1 hour. The results obtained are given in the table below:

| Percent NaOH Extracted | Percent Reduction | Percent of Chromium Recovered as Na₂CrO₄ by Calcining Reaction Product | Percent Total Chromium in Leached Reaction Product, Calculated as Cr₂O₃ |
|---|---|---|---|
| None | 99.5 | 17.4 | 82.6 |
| 53.0 | 99.5 | 25.2 | 74.8 |
| 64.0 | 99.4 | 26.0 | 74.0 |
| 73.5 | 99.5 | 24.7 | 75.3 |
| Na₂CrO₄ | -------- | 33.2 | 66.8 |

The above data show that as the amount of free alkali, calculated as NaOH, in the crude chromate material is decreased, the amount of cromium recovered from the reaction product as sodium chromate, after calcining at 1000° C. for ½ hours, is increased.

Example IV (a) 135 parts of chemically pure sodium chromate are placed in a tubular reactor and heated to a temperature of about 315° C. Gaseous hydrogen is passed through the mass of sodium chromate crystals for a period of 1 hour, while maintaining the temperature of the reaction mass between about 315° and less than 400° C. during the course of the reaction. The reaction product is recovered, a portion thereof being taken for chemical analysis, and the remainder subjected to ignition in air at 1000° C. for ½ hour, the results of the chemical analysis and ignition in air being given in the table below.

(b) A second portion, consisting of 135 parts of chemically pure sodium chromate, is mixed with 40 parts of sawdust and the mixture transferred to a nickel reactor. The mixture is heated indirectly with a gas burner until a reaction is initiated, and then the source of the heat cut off. The reaction continues substantially to completion spontaneously. The reaction product is thoroughly leached and washed with hot water and the insoluble residue dried, analyzed, and ignited in air at a temperature of 1000° C. for a period of ½ hour, with the results given in the table below.

(c) A further portion of chemically pure sodium chromate is mixed with the same amount of sawdust and in the same proportion of sawdust to chromate as that described in the paragraph immediately above, and the mixture of sawdust and sodium chromate placed in a nickel reactor and heated to a temperature sufficiently high to initiate reaction, at which time hydrogen gas is passed through the reacting mixture until the reaction is substantially complete. The reaction product is thoroughly leached and washed with hot water, the insoluble residue being dried, analyzed, and ignited in air at 1000° C. for a period of ½ hour, with the results given in the table below.

(d) Following the same procedure as that described above for reaction of sodium chromate with sawdust, a crude chromate-containing mixture having an analysis of 84.8% of sodium chromate, 4.74% of sodium aluminate, and 4.5% of NaOH, and 3.3% of sodium sulfate, is reacted with 2.5 equivalents of carbon in the form of finely divided charcoal. The reaction product is leached, washed, and the dried-washed product analyzed for chromium content, ignited in air at 1000° C. for a period of ½ hour, with the results shown in the table below:

| Na₂CrO₄ Reacted With— | (a) H₂, percent | (b) Sawdust, percent | (c) H₂ and Sawdust percent | (d) (Crude) Charcoal, percent |
|---|---|---|---|---|
| Chemical Analysis of Reaction Product (Wt. percent). | Cr 50.84<br>Na 15.85<br>H 0.4<br>O 32.9 | 53.45<br>4.96<br>1.21<br>35.75 | 53.44<br>7.77<br>0.96<br>36.01 | 43.0 |
| Ignition of Reaction Product in Air. | Gain 5.8 | Loss 12 | Loss 7.8 | ---------- |
| Na₂CrO₄ Content of Ignited Reaction Product. | 54 | 16.5 | 26.5 | 13.0 |
| Total Cr in Leached Reaction Product, Calculated as Cr₂O₃. | 80.6 | 84.5 | 84.5 | 67.0 |

Example V

Chrome ore is roasted in a conventional commercial alkaline chrome ore roasting process for the recovery of chromates and bichromates. The roast is leached with water to obtain a crude sodium chromate liquor containing 236 gms. of sodium chromate per liter. The liquor is spray-dried to give relatively small, spherical, highly porous, particles having a bulk density of 0.54 gm./cc., and having the following analysis:

|  | Percent |
|---|---|
| Na₂CrO₄ | 81.35 |
| NaOH | 2.68 |
| NaAlO₂ | 7.50 |
| Na₂SO₄ | 1.71 |

The remaining approx. 7% include moisture and minor impurities.

The spray-dried material is passed countercurrently to a stream of gaseous hydrogen through a horizontally positioned tubular reactor by means of a screw, which extends throughout the length of the reactor and is used to agitate the material. The rate of feed for the spray-dried crude chromate material is 315 parts per hour, and the rate of feed of the hydrogen is such that hydrogen is at all times in excess of that required to react with the chromate in the reactor. The reactor is heated indirectly to about 250°–270° C., at the chromate feed end, at 370°–425° C., at the midsection, and at 370°–375° C., at the hydrogen feed end. Under these conditions, the reaction product issues from the hydrogen feed end of the reactor at the rate of 260 parts per hour with a bulk density of 0.73 gm./cc.

585 parts of the reaction product are leached with hot water; the first leach is made with 585 parts of water, and the second with 286 parts of water, with filtration of the solids-solution mixture after each leaching step. Analysis of the leach liquor, for soluble hexavalent chromium compounds, shows that 99.5% of the sodium chromate of the starting material is converted to the reaction product. The leached dried product (310 parts) has a bulk density of 0.80 gm./cc.

The dried product is calcined at 750°–1000° C. in air and is found to gain in weight by 4.1%; the calcined product is found to contain 52.4% of Na₂CrO₄. The sodium chromate and small amounts of water soluble impurities are leached from the calcined product, leaving a chromic oxide residue having the following analysis:

| Cr₂O₃ | 96.5 |
|---|---|
| Al₂O₃ | 1.25 |
| Fe basis Cr | 0.04 |
| S basis Cr | 0.01 |

Example VI

Under substantially identical conditions as described in Example V above, further portions of the spray-dried chromate-containing material of Example V are fed to the reactor at different feed rates with the following results, compared with Example V:

| Rate of Production of H₂-Na₂CrO₄ Reaction Product | Percent Na₂CrO₄ in the Calcined (@ 1,000° C. in Air) H₂-Na₂CrO₄ Reaction Product |
|---|---|
| Ex. V, 260 parts/hr | 52.4 |
| Ex. VI, 190 parts/hr | 49.5 |
| Ex. VI, 151 parts/hr | 55.0 |

*Example VII*

A further quantity of crude sodium chromate obtained by spray-drying a leach liquor as described in Example V, and having a bulk density of 0.45 gm./cc., is passed through the reactor described in Example V at the rate of 265 parts/hour countercurrently to a stream of coke oven gas having the following analysis:

|  | Percent |
|---|---|
| Hydrogen | 55.0 |
| Methane | 27.5 |
| Carbon monoxide | 5.0 |
| Carbon dioxide | 1.8 |
| Nitrogen | 4.0 |
| Other organics | 3.5 |

The rate at which the coke oven gas is fed is such as to provide at all times an excess of hydrogen over that required to react with the chromate in the reactor. The temperature of the reactor at the chromate-feed end is maintained at 280° C., at the midsection at 425° C., and at the gas feed end at 375° C. Under these conditions, the reaction product issues from the reactor at the rate of 194 parts per hour, bulk density 0.79 gm./cc., with 97.1% of the sodium chromate fed being converted to the reaction product.

A total of 550 parts of the reaction product are dispersed in water to give a slurry having 24.4% solids. The slurry is filtered, the filter cake washed with water, and a washed filter cake containing 29% moisture obtained. This washed filter cake is dried and calcined in air at 750°–1000° C. and is found to have gained 4.6% of the weight of the dried material before calcining. The calcined material is leached with hot water and is found to contain 47.7% Na₂CrO₄.

*Example VIII*

A portion of an aqueous sodium chromate-containing liquor obtained from an alkaline chrome ore roasting process, as described in the forepart of Example V, is concentrated and a crude sodium chromate is crystallized therefrom, which crude sodium chromate is separated from the mother liquor and dried at about 110° C.

Analysis of this dried material gives the following:

|  | Percent |
|---|---|
| Na₂CrO₄ | 93.0 |
| Alkali calculated as NaOH | 1.5 |
| Na₂SO₄ | 2.4 |
| Less on ignition at 500° C | 0.4 |

The remaining approx. 2% being lesser amounts of minor impurities.

The dried crystalline material is passed countercurrently to a stream of hydrogen in the same reactor and in the same manner as described in Example V. The reactor is heated to a temperature at the chromate feed end of about 270° C., in the midsection, of about 370° C., and at the hydrogen feed end, of about 370° C.

The sodium chromate material having a bulk density of 1.03 gms./cc. is fed to the reactor at 1.96 parts per hour, and the reaction product having a bulk density of 0.73 gm./cc., issues from the reactor at 1.21 parts per hour. Hydrogen is fed to the reactor at such a rate that at all times there is provided a substantial excess over that required to react with the chromate material passing through the reactor.

It is noted that when the reaction rate is substantially increased by increasing the rate at which the hydrogen gas is fed, the reaction mass becomes luminescent (dull red glow), and within a short time, tends to adhere to the walls of the reactor, agglomerate excessively, and otherwise appear to be approaching a state of incipient fusion. Decreasing the rate of hydrogen feed relieves this condition and the reaction mass again acquires a granular pulverulent condition.

The total reaction product obtained is leached with water to remove water soluble compounds, and the leach liquor analyzed for hexavalent chromium compounds. From the amount of hexavalent chromium in the leach liquor, it is calculated that the overall efficiency of the reaction is 94%. The bulk density of the leached, dried, reaction product is 0.85 gm./cc.

A portion of this leached, dried, reaction product is calcined in air @ 1000° C., and the calcined product analyzed for Na₂CrO₄ and Cr₂O₃ and is found to contain 46.4% Na₂CrO₄ and 53.6% Cr₂O₃. Leaching of the calcined product gives a leach liquor, from which a C. P. grade Na₂CrO₄ is obtained.

While there have been described in detail certain forms of the invention and embodiments of its practice, the invention is not to be understood as being limited to the detailed disclosure as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The method which includes the steps of passing a stream of hydrogen in contact with a mass of dry, solid particles comprising alkali metal chromate, in a reaction zone, said particles being made up substantially only of substances unreactive with said chromate under the conditions hereof, maintaining the reacting mass at a temperature above about 250° C., and below the fusion point of said mass, during the contact of said chromate and said hydrogen, until the reaction of said chromate and said hydrogen is substantially complete, and recovering the chromium-containing reaction product thus formed the chromium of said reaction product being in an intermediate state of oxidation between that of trivalent and hexavalent chromium.

2. The method of claim 1 in which said mass is agitated during the passing of said stream in contact with said mass.

3. The method of claim 1 in which said mass and said stream of hydrogen are countercurrently contacted.

4. The method of claim 1 in which said chromium-containing reaction product is roasted in an atmosphere containing oxygen at a temperature above 600° C., cooled, leached with water, and the chromium content of said reaction product is recovered as solid chromic oxide and a solution of alkali metal chromate.

5. The method which includes the steps of passing a stream of hydrogen gas in contact with a mass comprising sodium chromate particles, in a reaction zone, said particles being made up substantially only of substances unreactive with said chromate under the conditions hereof, maintaining the reacting mass at a temperature above about 250° C., and below the fusion point of said mass, during the contact of said chromate and said hydrogen, until the reaction of said chromate and said hydrogen is substantially complete, maintaining said mass in an agitated condition during the passage of said stream in contact with said mass, and recovering the chromium-containing reaction product thus formed the chromium of said reaction product being in an intermediate state of oxidation between that of trivalent and hexavalent chromium.

6. The method of claim 5 in which said mass and said stream of hydrogen are countercurrently contacted.

7. The method of claim 5 in which said chromium-containing reaction product is roasted in an atmosphere containing oxygen at a temperature above 600° C., cooled, leached with water, and the chromium content of said reaction product is recovered as solid chromic oxide and a solution of sodium chromate.

8. The method of treating a mixture containing a preponderance of sodium chromate, with lesser amounts of sodium aluminate, sodium hydroxide, and sodium carbonate, as the principal contaminants, said mixture being made up substantially only of substances unreactive with said chromate under the conditions hereof, which method includes the steps of passing a stream of hydrogen in contact with a mass of said mixture in dry granular form, in a reaction zone maintaining said mass at a temperature above about 250° C., and below the fusion point of said mass, during the contact of said chromate and hydrogen until the reaction of said hydrogen and said chromate of said mass is substantially complete, and recovering the chromium-containing reaction product thus formed the chromium of said reaction product being in an intermediate state of oxidation between that of trivalent and hexavalent chromium.

9. The method of claim 8 in which said mass is agitated during the passing of said stream in contact with said mass.

10. The method of claim 8 in which said mass and said stream of hydrogen are countercurrently contacted.

11. The method of claim 8 in which said chromium-containing reaction product is roasted in an atmosphere containing oxygen at a temperature above 600° C., cooled, leached with water, and the chromium content of said reaction product is recovered as solid chromic oxide and a solution of sodium chromate.

12. The method of treating sodium chromate, which includes the steps of passing a stream of hydrogen in contact with said chromate, initially maintaining the reacting mass at a temperature above about 250°, and below the fusion point of said mass, during the contact of said chromate and said hydrogen until appreciable reaction between said hydrogen and said chromate has been effected, thereafter maintaining said mass in contact with hydrogen at a temperature substantially within the range of 300°–600° C., until the reaction of said hydrogen and said chromate is substantially complete, and recovering the chromium-containing reaction product thus formed the chromium of said reaction product being in an intermediate state of oxidation between that of trivalent and hexavalent chromium.

13. The method of claim 12 in which said mass is agitated during contact with said hydrogen.

14. The method of claim 12 in which said mass and said hydrogen are countercurrently contacted.

References Cited in the file of this patent

UNITED STATES PATENTS

| | | |
|---|---|---|
| 1,723,556 | Meyer et al. | Aug. 6, 1929 |
| 1,935,082 | Demant | Nov. 14, 1933 |
| 2,587,552 | Vedensky | Feb. 26, 1952 |

FOREIGN PATENTS

| | | |
|---|---|---|
| 509 | Great Britain | of 1872 |